Patented Dec. 15, 1942

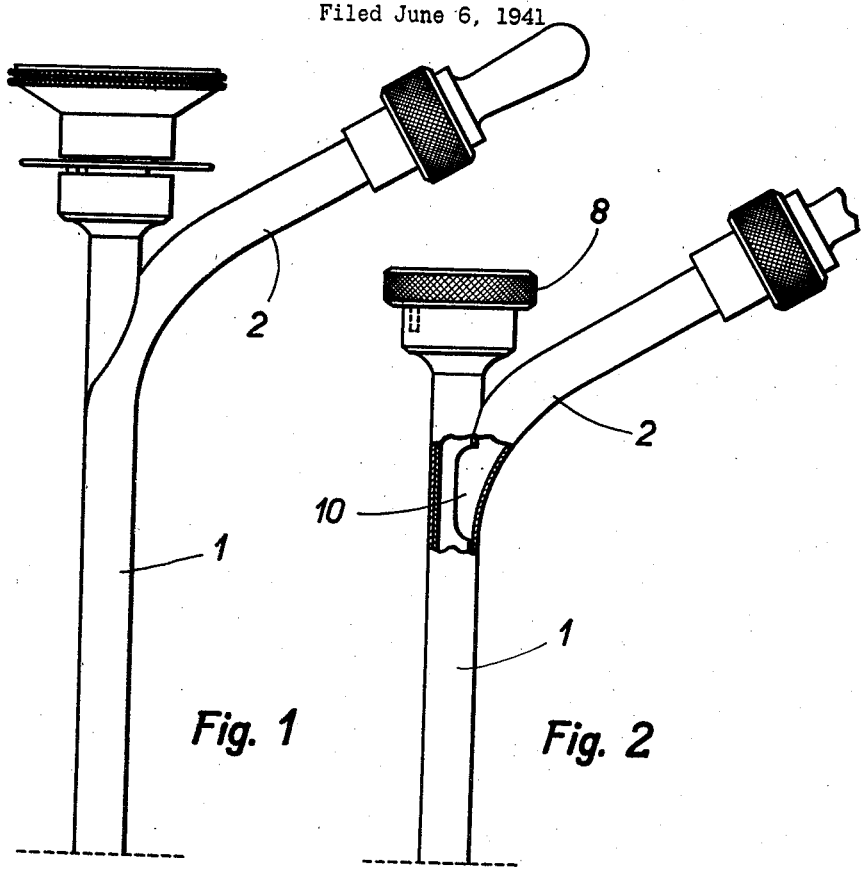
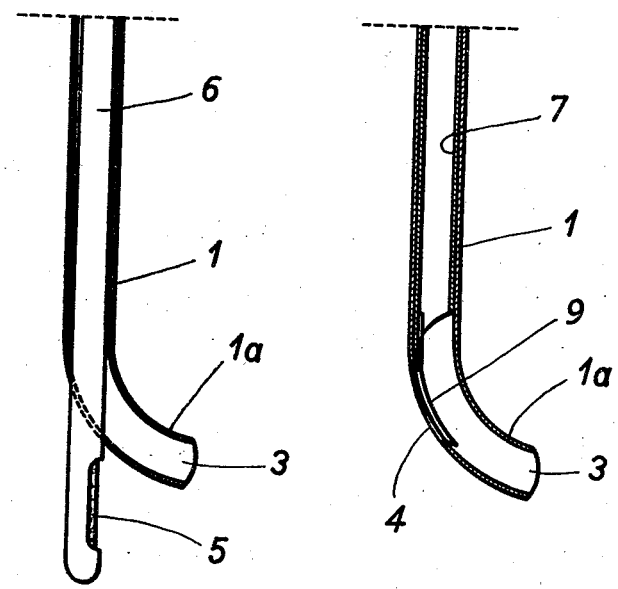

2,305,462

UNITED STATES PATENT OFFICE 2,305,462

CYSTOSCOPIC INSTRUMENT

Richard Wolf, Berlin, Germany; vested in the Alien Property Custodian

Application June 6, 1941, Serial No. 396,914
In Germany June 20, 1940

3 Claims. (Cl. 128—3)

The invention relates to a surgical instrument for the examination of body cavities and for the removal by suction of stones and stone fragments from the bladder, the instrument having an outer tube into which an optical tube can be introduced and at whose rear end a tubular sleeve is disposed which can be connected to a suction device. In the known instruments of this type the outer tube is in its longitudinal direction subdivided into two sections, one section serving as the suction tube and the other as the guide-tube through which the optical tube is to be introduced. The sections of the outer tube of said instruments are separated by corresponding partitions. This known design had the disadvantage of permitting the removal by suction of small stones only from the bladder, since the cross section of the suction tube could be part only of that of the outer tube. On the other hand it was not possible to increase the cross-section of the outer tube as this would have involved difficulties when introducing the instrument into the bladder.

In order to make the full cross-section of the outer tube available for the removal by suction of said stones, including stones and stone fragments of larger size, it is suggested according to the invention that the outer and convex side of the tail end of the outer tube which ends as a suction intake be provided with an opening through which the objective end of the optical tube can be passed, and that the instrument be equipped with an auxiliary tube which well fits and can be introduced into the outer tube in place of the optical tube. The auxiliary tube should be so designed that it closes the outer tube at the rear end while at the introducing end it is open. In addition to that the introducing end of the auxiliary tube should be so designed that, when introduced, this tube closes said opening in the convex side of the intake of the outer tube, the auxiliary tube being at the same time provided near its rear end with a lateral opening which, when the tube has been introduced, coincides with the confluence of said suction sleeve into the outer tube. When in this position the stones can be removed by suction through the auxiliary tube.

It will be advisable to design the front end of the auxiliary tube to form an elastic tongue which on introducing the tube into the outer tube seats around said opening in the convex section of said intake, whereby it will be expedient to place a sheet gasket of good packing property, as rubber, for instance, on that side of said tongue which comes to lie opposite of said opening of said intake.

A constructional example of the invention is shown on the annexed drawing, Fig. 1 giving a lateral view of the instrument drawn partly in section with the optical tube in introduced position, and Fig. 2 showing the same view partly in section with the auxiliary tube in introduced position.

The instrument as illustrated comprises an outer tube 1 having a suction sleeve 2. The front end 1a of the outer tube is bent in a trunk-like fashion in order that the suction hole 3 may be conveniently brought near the stones which are to be removed by suction. On the outer, convex side the suction end is provided with an opening 4 through which the objective end 5 of an optical tube 6 can pass.

On the position of the stone in the bladder having been determined and the suction hole 3 having been brought near the stone, the optical tube 6 is pulled out of the outer tube 1 and an auxiliary tube 7 introduced whose head 8 closes the outer tube 1 at its ocular end. To the front end of the tube 7 a metal tongue 9 is soldered which lies flush against the curvature of the suction end 1a and closes the opening 4 from the inside. Though experiments having shown that the sealing effect obtained thereby is adequate in general, it may be rendered perfect by placing upon the outer surface of the tongue 9 a gasket of a suitable sealing substance, such as vulcanised rubber. Near its rear end the auxiliary tube is provided with a lateral hole which in the position shown in the drawing coincides with the confluence of the suction sleeve 2 into the outer tube.

I claim:

1. In a cystoscopical instrument for examining body cavities and for removing stones from the bladder by suction, an outer tube, a suction sleeve disposed at the rear end of the outer tube and adapted to be connected with a suction device, that end of the outer tube to be introduced into the bladder being laterally bent straight, and having an opening in the convex side of said end forming the straight continuation of the non-bent part of the inside of the outer tube to permit the passage of a straight removable optical tube, an auxiliary tube adapted for introduction into the outer tube, said auxiliary tube being open at the introducing end and closed at the rear end, the introducing end of the auxiliary tube being so designed that this tube when in introduced position closes said opening in the convex side of said trunk, the auxiliary tube having near its rear end a lateral opening which on said tube being introduced coincides with the confluence of said suction sleeve into the outer tube thus enabling the stones to be removed by suction through the auxiliary tube and the suction sleeve.

2. In a cystoscopical instrument for examining body cavities and for removing stones from the bladder by suction, an outer tube, a suction sleeve disposed at the rear end of the outer tube and adapted to be connected with a suction device, that end of the outer tube to be introduced into the bladder being laterally bent straight, and having an opening in the convex side of said end forming the straight continuation of the non-bent part of the inside of the outer tube to permit the passage of a straight removable optical tube, an auxiliary tube adapted for introduction into the outer tube, said auxiliary tube being open at the introducing end and closed at the rear end, an elastic tongue forming the front end of the auxiliary tube and being so designed that, with said tube being in introduced state, it closes said opening in the convex side of said trunk, the auxiliary tube having near its rear end a lateral opening which on said tube being introduced coincides with the confluence of said suction sleeve into the outer tube thus enabling the stones to be removed by suction through the auxiliary tube and the suction sleeve.

3. In a cystoscopical instrument according to claim 2, said tongue being provided with a sealing substance on that one of its sides which comes to lie opposite to the said opening in the convex side of the auxiliary tube.

RICHARD WOLF.